US010753783B2

(12) United States Patent
Malinovskiy et al.

(10) Patent No.: US 10,753,783 B2
(45) Date of Patent: Aug. 25, 2020

(54) METHOD FOR DETERMINING AN INNER DIAMETER OF A SOUNDING TUBE BY A FILL-LEVEL MEASURING DEVICE

(71) Applicant: Endress + Hauser GmbH + Co. KG, Maulburg (DE)

(72) Inventors: Alexey Malinovskiy, Maulburg (DE); Stefan Gorenflo, Hausen (DE); Jens Merle, Schopfheim (DE); Markus Vogel, Hausen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 553 days.

(21) Appl. No.: 15/464,825

(22) Filed: Mar. 21, 2017

(65) Prior Publication Data
US 2017/0276536 A1  Sep. 28, 2017

(30) Foreign Application Priority Data
Mar. 23, 2016  (DE) .......................... 10 2016 105 419

(51) Int. Cl.
*G01F 25/00* (2006.01)
*G01B 21/14* (2006.01)
(Continued)

(52) U.S. Cl.
CPC ......... *G01F 25/0061* (2013.01); *G01B 15/00* (2013.01); *G01B 21/14* (2013.01);
(Continued)

(58) Field of Classification Search
CPC .... G01F 25/00; G01F 25/0061; G01F 23/284; G01F 23/2845; G01B 15/00;
(Continued)

(56) References Cited

U.S. PATENT DOCUMENTS 4,641,139 A * 2/1987 Edvardsson .......... G01F 23/284
342/124
5,099,244 A * 3/1992 Larson .................. H01Q 17/00
342/1

(Continued)

FOREIGN PATENT DOCUMENTS

DE  10 2013 108 490 A1  2/2015
DE  10 2014 101 904 A1  8/2015
(Continued)

OTHER PUBLICATIONS

German Search Report, German PTO, Munich, Jan. 31, 2017.

*Primary Examiner* — Peter M Bythrow
(74) *Attorney, Agent, or Firm* — Bacon & Thomas, PLLC

(57) ABSTRACT

A method for determining an inner diameter of a sounding tube, which, for measuring the fill level of a fill substance located in a process space of a container, extends in the process space, or is placed alongside the container and connected with the process space. The method can be implemented in the case of a fill-level measuring device working according to the FMCW-principle. Besides the intermediate frequency of the difference signal, also its phase shift is ascertained, wherein the exact tube inner diameter can be determined based on the phase shift. An advantage of the method is that the fill-level measuring device with the help of the then exactly known tube diameter can be recalibrated and accordingly the fill level determined more exactly. The exact tube inner diameter does not have to have been previously known.

14 Claims, 3 Drawing Sheets

(51) Int. Cl.
*G01S 13/88* (2006.01)
*G01S 7/03* (2006.01)
*G01S 7/40* (2006.01)
*G01B 15/00* (2006.01)
*G01F 23/284* (2006.01)
*G01S 7/06* (2006.01)
*G01S 7/35* (2006.01)

(52) U.S. Cl.
CPC ............. *G01F 23/284* (2013.01); *G01S 7/03* (2013.01); *G01S 7/06* (2013.01); *G01S 7/35* (2013.01); *G01S 7/4004* (2013.01); *G01S 13/88* (2013.01)

(58) Field of Classification Search
CPC ... G01B 21/10; G01S 7/03; G01S 7/35; G01S 7/356; G01S 7/352; G01S 7/40; G01S 7/4004; G01S 13/88; G01S 13/882
See application file for complete search history.

(56) References Cited

U.S. PATENT DOCUMENTS

| | | | |
|---|---|---|---|
| 6,054,946 A * | 4/2000 | Lalla | G01F 23/284 342/124 |
| 6,915,689 B2 * | 7/2005 | Edvardsson | H01Q 1/225 73/290 V |
| 2008/0156108 A1 * | 7/2008 | Matt | G01F 1/8413 73/861.356 |
| 2008/0223147 A1 * | 9/2008 | Deutscher | G01F 1/668 73/861.27 |
| 2014/0028492 A1 * | 1/2014 | Mayer | G01F 23/284 342/124 |
| 2015/0233750 A1 | 8/2015 | Malinovskiy | |

FOREIGN PATENT DOCUMENTS

| | | |
|---|---|---|
| DE | 10 2014 112 228 A1 | 3/2016 |
| EP | 0 955 528 A1 | 11/1999 |

* cited by examiner

METHOD FOR DETERMINING AN INNER DIAMETER OF A SOUNDING TUBE BY A FILL-LEVEL MEASURING DEVICE

TECHNICAL FIELD

The invention relates to a method for determining an inner diameter of a sounding tube, which, for measuring the fill level of a fill substance located in a process space of a container, extends into the process space or is placed beside the container and is connected with the process space.

BACKGROUND DISCUSSION

In automation technology, especially in process automation technology, field devices are often applied, which serve for registering and/or influencing process variables. Serving for registering process variables are sensors, which are installed, for example, in fill level measurement devices, flow measuring devices, pressure- and temperature measuring devices, pH redox-potential measuring devices, conductivity measuring devices, etc., which register the corresponding process variables, fill level, flow, pressure, temperature, pH-value, redox potential, and conductivity, respectively. Serving for influencing process variables are actuators, such as, for example, valves or pumps, via which, respectively, the flow of a liquid in a section of pipeline or the fill level in a container can be changed. Referred to as field devices are, in principle, all devices, which are applied near to the process and deliver, or process, process relevant information. In connection with the invention, the terminology, field devices, thus also includes remote I/Os, radio adapters, and, in general, all electronic components arranged at the field level. A great number of such field devices are manufactured and sold by the firm, Endress+Hauser.

Used for fill level measurement of fill substances in containers are contactless measuring methods. They offer the advantages of robustness and low-maintenance. A further advantage is their ability to measure the fill level virtually continuously, thus with a very high resolution. Applied in the field of continuous fill level measurement are primarily radar-based measuring methods. An established measuring principle, in such case, is the pulse travel time measuring principle, also known under the name, pulse radar. In such case, a microwave pulse is transmitted toward the fill substance and the travel time measured until receipt of the echo pulse. Using this measuring principle, pulse radar-based fill level measuring devices can be implemented comparatively without great circuit complexity. However, the resolution of this measuring device type is limited. Among the reasons for this is that the emitted microwave pulses cannot be infinitesimally short. Thus, the accuracy of measurement of the travel time is reduced and, so, also, the accuracy of measurement of the fill level.

To the extent that a more complex circuit technology can be tolerated, also FMCW (Frequency Modulated Continuous Wave) can be used as the measuring principle for radar-based fill level measurement. This principle enables a still higher resolution than possible with the pulse travel time measuring principle. The measuring principle of the FMCW-based radar distance measuring method rests on continuously transmitting a high-frequency microwave signal. In such case, the frequency of the signal lies in a fixed frequency band in the region of a standardized center frequency ($f_0$). According to standard, here frequency bands in the 6 GHz band, the 26 GHz band, or the 79 GHz band are used. Characteristic for the FMCW method is that the transmitted frequency is not constant, but, instead, varies periodically within a frequency band. The frequency change can, in such case, be linear and have a sawtooth or triangular shape. A sinusoidal variation can, however, also be used, depending on application.

As in the case of pulse radar, there is also in the case of the FMCW-based fill level measuring method a special challenge in detecting the measurement signal free of doubt as to the correctness of the identification when disturbance signals are present. Thus, defective measured values can be generated, based on which the functional ability of the fill-level measuring device is degraded. A significant cause, in such case, is the receipt of disturbance echo signals, which arise not on the surface of the fill substance, but, instead, by reflection of the transmitted signal on disturbing bodies, such as stirrers or objects installed in the container.

In the interim, many technical approaches have been proposed, in order to identify, or filter out, these types of disturbance echo signals. Thus, known from Published International Application, WO 2012/139852 A1 is a method for calibration of FMCW-based fill-level measuring devices, in the case of which an unequivocal calibration-signal is generated by means of an oscillating reference reflector positioned between measuring device and fill substance.

An opportunity for preventing the registering of echo signals from disturbing bodies from the outset is provided by the application of a sounding tube or bypass tube. In such case, the sounding tube is placed in the container, for instance, vertically within the process space. In such case, atmosphere can flow in and out of the sounding tube in such a manner that the fill level of the fill substance within the sounding tube agrees with the fill level within the remaining process space.

In the case of a bypass tube, such is placed alongside the container, wherein it also, in this case, is connected with the process space in such a manner that also here the fill level in the bypass-pipe equals the fill level in the process space.

In the case of application of a sounding- or bypass tube, the fill-level measuring device is not, such as otherwise usual, arranged in such a manner that the antenna of the fill level measuring device is facing directly into the process space of the container, in which the fill substance is located. Rather, the fill-level measuring device is so placed on the upper end of the sounding tube that the antenna of the fill level measuring device transmits the microwave signal along the sounding tube toward the fill substance.

Fill level measuring devices, which are arranged on sounding tubes of round inner diameter, are calibrated, as a rule, using the tube inner diameter of the later used sounding tube. In the case of applications in the oil- and gas industry, calibration is frequently based on a reference inner diameter according to the standard DIN EN ISO 6708, for example, DN 100.

A problem occurs when the tube inner diameter of the sounding tube, on which the fill-level measuring device is placed in later use, does not exactly agree with the reference inner diameter of the calibration tube. This frequent case is disadvantageous to the extent that even a small difference between the inner diameters causes a significant measurement error in the fill level measurement and accordingly leads to a very inexact fill level measurement.

SUMMARY OF THE INVENTION

An object of the invention, therefore, is to provide a method, with which FMCW-based fill level measuring devices, which are used on sounding tubes or bypass tubes, can measure fill level exactly, in spite of not exactly known tube inner diameter.

The invention achieves this object by a method for determining an inner diameter of a sounding tube, which, for measuring the fill level of a fill substance located in a process space of a container, extends in the process space or is placed alongside the container and connected with the process space. For this, the method of the invention comprises method steps as follows:

by means of a periodic electrical signal, such as usual in the case of the FMCW method, a microwave signal is produced, wherein the electrical signal (s) has a periodic frequency change in the region of a center frequency, the microwave signal is transmitted along the sounding tube in the direction of the surface of the fill substance, an echo signal, which, after reflection of the microwave signal on the surface of the fill substance, is reflected along the sounding tube in opposite direction, is received and converted into an electrical, received signal, by mixing the received signal with the electrical signal, a difference signal with an intermediate frequency is produced, as a function of the fill level, a phase shift between the difference signal and the electrical signal is ascertained, according to the invention, a phase difference between the phase shift and a previously known, base phase shift, which is based on a reference inner diameter, is ascertained, and based on the phase difference, the tube inner diameter is determined.

The periodic frequency change used, as a rule, in the FMCW method is preferably a sawtooth-shaped or triangular change of the electrical signal. In such case, the fill level is determined based on the intermediate frequency and/or the base phase shift.

A central advantage of the method of the invention is that the measuring of the fill level can be recalibrated based on the so ascertained, tube inner diameter. This enables an exact determining of the fill level, even when the tube inner diameter was not previously exactly known.

A simple ascertaining of the phase shift is possible, for example, by means of a fast Fourier transformation (FFT) of the difference signal. Alternatively, naturally, also an ordinary type of Fourier transformation could be used.

Preferably, the tube inner diameter is determined based on the change of the phase difference as a function of the fill level. In this case, it is especially advantageous when the tube inner diameter (D) is calculated using the formula $$D = D_0 * \frac{f_c}{f_r * \sqrt{1 - \left(\frac{\beta}{\alpha}\right)^2}} \text{ with}$$

$$\beta = \sqrt{1 - \left(\frac{f_c}{f_r}\right)^2} \text{ and}$$

$$\alpha = 1 + \frac{c\beta}{8\pi f_r} * \frac{d\Delta\phi}{dL}.$$

In such case, c is the free-field wave propagation velocity. Frequency $f_c$ is the previously known limit frequency in a calibration tube having the reference inner diameter ($D_0$).

Frequency $f_r$ is a reference frequency, for example, the center frequency of the electrical signal.

The change $$\left(\frac{d\Delta\phi}{dL}\right)$$

can be ascertained, for example, by any type of linear regression.

According to the invention, the base phase shift can be ascertained in a number of ways, especially by a theoretical calculation, a simulation, and/or based on calibration data. For the case, in which base phase shift is ascertained based on calibration data, the calibration, on which the calibration data is based, is preferably performed using a calibration tube, which has the reference inner diameter. It is advantageous when the reference inner diameter is about equal to the later tube inner diameter.

Furthermore, the object of the invention is achieved by a fill-level measuring device for performing the method described in at least one of the preceding variants. Such fill-level measuring device comprises:

a signal production unit for producing the electrical signal, an antenna unit for transmitting the microwave signal and/or for receiving the echo signal and/or for changing the reflected echo signal into an electrical, received signal, a mixer for mixing the electrical signal with the received signal, and an evaluating unit for determining the tube inner diameter based on the phase difference and/or for determining the fill level based on the frequency of the difference signal.

In the case of fill level measuring devices of the state of the art, the evaluating unit includes a further processing unit for digitizing and/or for filtering and/or for amplifying the difference signal. In order to be able to isolate the difference signal as much as possible from possible disturbance signals, it is advantageous, when the further processing unit includes a bandpass filter, which is especially transmissive for the intermediate frequency of the difference signal.

Depending on field of application of the fill level measuring device, it is advantageous, when the tube inner diameter ascertained by the method of the invention can be displayed for service- or maintenance personnel. Therefore, it is advantageous when the fill-level measuring device includes a display unit for display of the tube inner diameter. In this case, there are the options that the fill-level measuring device recalibrates itself based on the tube inner diameter either automatically or only upon request by service- or maintenance personnel.

In this recalibration, the fill-level measuring device adopts the tube inner diameter ascertained according to the invention and determines therefrom based on a theoretical calculation a corresponding propagation velocity of the microwave signal in a tube with the ascertained tube inner diameter. Formulas for this calculation are known and belong to the state of the art. The determining of the fill level from the signal travel time occurs then using the calculated propagation velocity.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
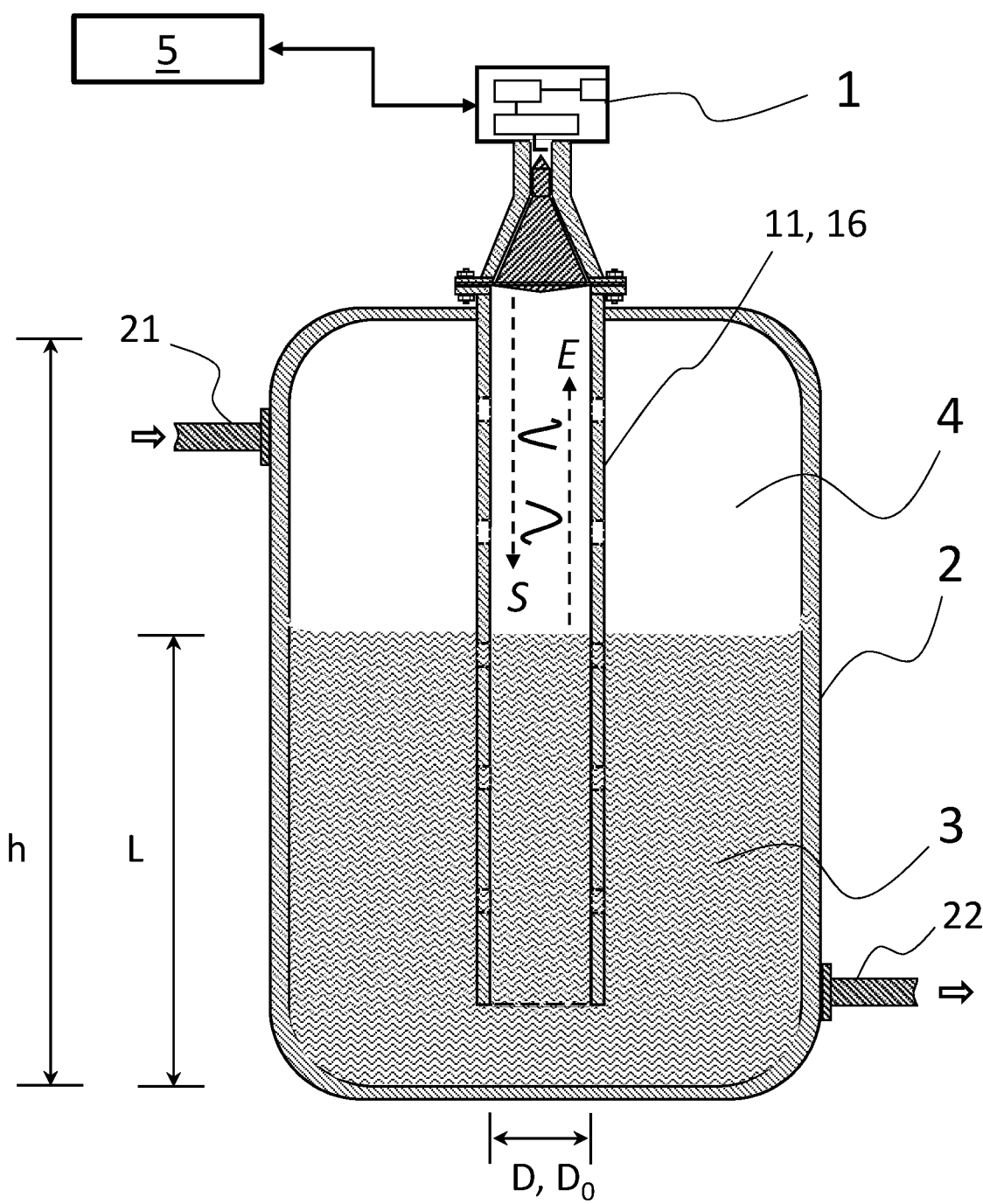
FIG. 1 is a typical arrangement of an FMCW fill level measuring device on a sounding tube.

FIG. 1 shows a typical arrangement on a sounding tube 11 of a fill level measuring device 1 working according to the FMCW-principle. Sounding tube 11 is arranged approximately vertically in a process space 4 of a container 2. Located in the process space 4 is a fill substance 3, whose fill level L is to be determined by the fill-level measuring device 1. Fill-level measuring device 1 is mounted above the fill substance 3 on the sounding tube 11 at a previously known, installed height h. In such case, the container 2, and the process space 4, can, depending on field of application, have a height of greater than 30 m. Fill-level measuring device 1 is placed in such a manner on the upper end of the sounding tube 11 that it transmits, i.e. sends, a microwave signal S along the sounding tube 11 toward the fill substance 3 and after reflection on the surface of the fill substance 3 receives an echo signal E.

Alternatively to insertion of the sounding tube 11 within the container 2, another option is that the sounding tube 11 is placed alongside the container 2. Also in this case, the sounding tube 11 would be connected in such a manner with the process space 4 that the fill level L there reigns likewise in the sounding tube 11.

As a rule, the fill-level measuring device 1 is connected via a bus system, for instance, a PROFIBUS, HART or Wireless HART bus system, with a superordinated unit 5, for example, a process control system. In this way, on the one hand, information concerning the operating state of the fill level measuring device 1 can be communicated. Also information concerning the fill level L can be transmitted, in order, in given cases, to control inlets 21 and/or outlets 22 present on the container 2.

Sounding tube 11 has in practice an inner diameter D, which, as a rule, is not exactly known, or deviates from its nominal value. Moreover, the fill-level measuring device 1 is usually calibrated on a calibration tube 16 having a reference inner diameter $D_0$, which does not exactly correspond to the tube inner diameter D. A reason for this can be, for example, deposits in the sounding tube or differing manufacturing methods. The result is that the fill-level measuring device 1 cannot determine the fill level L exactly. Thanks to the method of the invention, it is, however, possible, based on the reference inner diameter $D_0$, to ascertain the tube inner diameter D exactly. By means of the exactly ascertained tube inner diameter D, it is then possible to recalibrate the fill-level measuring device 1 based on the tube inner diameter D, so that an exact measurement of the fill level L can be performed.

If the fill-level measuring device 1 has a display unit or has access to a display unit, it is additionally possible to display the exactly ascertained tube inner diameter D on such display unit. In this connection, an embodiment provides that the fill-level measuring device 1 does not perform the recalibration automatically, but, instead, only after consent of service- or service personnel, to the extent that it is considered necessary due to the indicated tube inner diameter D.

Figure 2:
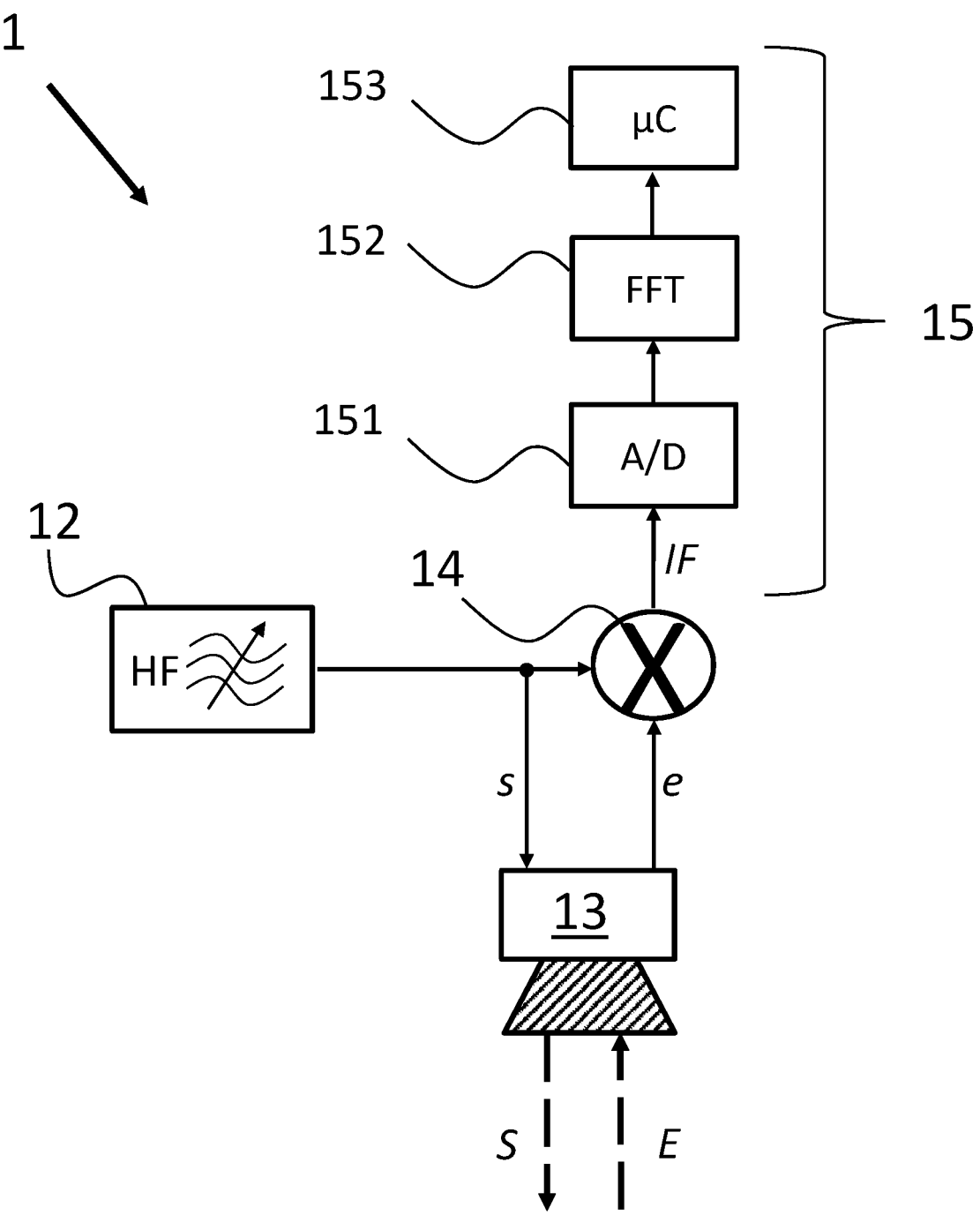
FIG. 2 is a block diagram of a fill level measuring device for performing the method of the invention.

An example of a circuit of the fill level measuring device 1 for performing the method of the invention is shown in FIG. 2. For reasons of perspicuity, only signal paths and no control paths are shown in FIG. 2. Pivotal for producing the microwave signal S is a signal production unit 12. It produces a typical FMCW electrical signal s, which is located in the region of a center frequency $f_0$ in the GHz region and exhibits a constant frequency change $f'_0$.

Figure 3:
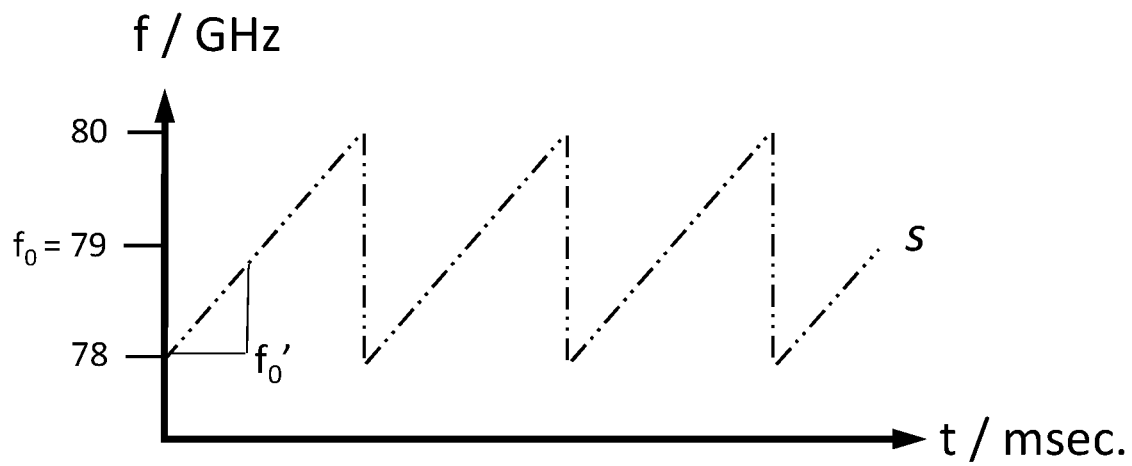
FIG. 3 is a sawtooth-shaped excitation of the microwave signal.

As shown in FIG. 3, it can be a sawtooth-shaped excitation having a center frequency of 79 GHz currently usual for FMCW and a bandwidth of 2 GHz. In contrast to this sawtooth-shaped excitation with frequency linearly increasing with time, another option is a sawtooth-shaped excitation with frequency decreasing with time.

Signal production unit 12 can be, for example, a voltage controlled oscillator, which includes a quartz oscillator suitable for such purpose.

In the fill-level measuring device, which is shown in FIG. 2, the microwave signal S is produced in an antenna unit 13 by means of the electrical signal s. Additionally evident from FIG. 2 is that the antenna unit 13, besides producing the microwave signal S, also receives the echo signals E, which arise by reflection of the microwave signal S on the surface of the fill substance 3. Alternatively to the illustrated situation, this could also happen according to the invention via a separate receiving antenna.

The echo signal E is converted by the antenna unit 13 into an electrical, received signal e. In measurement operation, then the received signal e is mixed in a mixer 14 with the transmitted signal s. By mixing the received signal e with the transmitted signal s, a difference signal IF is formed, wherein the intermediate frequency $f_{IF}$ of the difference signal IF is derived from the difference between the instantaneous frequency of the transmitted signal s and the instantaneous frequency of the received signal e.

For ascertaining the intermediate frequency $f_{IF}$ of the difference signal IF as well as the phase shift $\phi_{actual}(L)$ between the difference signal IF and the electrical signal s, the fill-level measuring device includes an evaluating unit 15. The ascertaining of these two values $f_{IF}$, $\phi_{actual}(L)$ is performed, in such case, per fast Fourier transformation by a calculational unit 152 provided for this. As usual in the case of processing this data, this happens based on digitized signals. Therefore, in the case of the evaluating unit 15 illustrated in FIG. 2, a further processing unit 151 is placed in front of the fast Fourier transformation. This could likewise be designed in such a manner that the difference signal IF is subjected to an amplification or bandpass filtering, which is transmissive especially for the intermediate frequency $f_{IF}$ of the difference signal IF.

Based on the intermediate frequency $f_{IF}$ as well as the phase shift $\phi_{actual}(L)$, such as is usual in the case of FMCW-based fill-level measuring devices, the fill level L is ascertained by a microcontroller 153.

According to the invention, based on a difference forming, the phase shift $\phi_{actual}(L)$ is compared with a base phase shift $\phi_{base}(L)$. In the case of the fill-level measuring device illustrated in FIG. 2, this is done by the microcontroller 153. In such case, the base phase shift $\phi_{base}(L)$ is stored in the microcontroller 153. It can be obtained, for example, by a calibration measurement on a calibration tube 16 having a reference inner diameter $D_0$.

Figure 4:
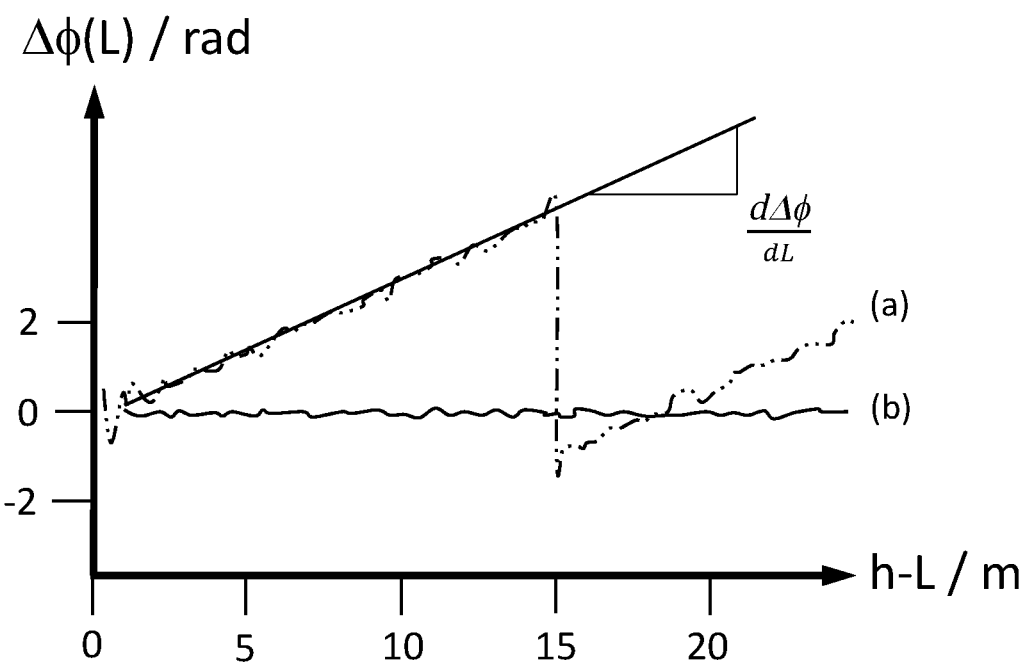
FIG. 4 is a phase difference between the phase shift of the received signal and a previously known, base phase shift.

Forming the difference leads to a phase difference $\Delta\phi(L)$. A characteristic phase difference $\Delta\phi(L)$ as a function of fill level L is shown in FIG. 4 (curve a). As characteristic in the case of tube inner diameters D, which deviate from the reference inner diameter $D_0$ of the calibration measurement, the illustrated curve has an approximately linear rise $$\frac{d\Delta\phi}{dL}$$

with increasing distance h-L.

Based on the slope $$\frac{d\Delta\phi}{dL},$$

the exact tune inner diameter D can be determined. This is calculated via the relationship:

$$D = D_0 * \frac{f_c}{f_r * \sqrt{1 - \left(\frac{\beta}{\alpha}\right)^2}} \text{ with}$$

$$\beta = \sqrt{1 - \left(\frac{f_c}{f_r}\right)^2} \text{ and}$$

$$\alpha = 1 + \frac{c\beta}{8\pi f_r} * \frac{d\Delta\phi}{dL}.$$

The calculating occurs in the case of the fill-level measuring device 1 illustrated in FIG. 2, again, by the microcontroller 153. In such case, the slope $$\frac{d\Delta\phi}{dL},$$

such as shown in FIG. 4, is determined, for example, by linear regression of the phase difference $\Delta\phi(L)$.

By exactly determining the tube inner diameter D, the fill-level measuring device 1 can correspondingly recalibrate itself and then determine the fill level L exactly. With regard to the phase difference $\Delta\phi(L)$, the recalibration has the result that the phase shift $\phi_{actual}(L)$ approximately matches the base phase shift $\phi_{actual}(L)$ (see curve b in FIG. 4).

The invention claimed is:

1. A method for determining an inner diameter of a sounding tube, wherein, for measuring a fill level of a fill substance located in a process space of a container, the sounding tube extends in the process space, or wherein the sounding tube is placed alongside the container and connected fluidically with the process space, the method comprises method steps as follows:

by means of a periodic electrical signal, a microwave signal is produced, wherein the electrical signal has a periodic frequency change in the region of a center frequency;

the microwave signal is transmitted along the sounding tube in a direction of a surface of the fill substance;

an echo signal, which, after reflection of the microwave signal on the surface of the fill substance, is reflected along the sounding tube in opposite direction, is received and converted into an electrical, received signal;

by mixing the received signal with the electrical signal, a difference signal with an difference frequency is produced;

as a function of the fill level, a phase shift between the difference signal and the electrical signal is ascertained;

a phase difference between the phase shift and a previously known, base phase shift, which is based on a reference inner diameter, is ascertained; and based on the phase difference, a tube inner diameter is determined;

wherein the tube inner diameter (D) is calculated based on the formula $$D = D_0 * \frac{f_c}{f_r * \sqrt{1 - \left(\frac{\beta}{\alpha}\right)^2}} \text{ with}$$

$$\beta = \sqrt{1 - \left(\frac{f_c}{f_r}\right)^2} \text{ and}$$

$$\alpha = 1 + \frac{c\beta}{8\pi f_r} * \frac{d\Delta\phi}{dL}$$

and wherein the change $$\left(\frac{d\Delta\phi}{dL}\right)$$

is ascertained by linear regression;

wherein:
c=speed of light;
π=Archimedes' constant;
$D_0$=reference inner diameter;
$f_c$=limit frequency in a tube with diameter $D_0$;
fr=reference frequency; and $$\frac{d\Delta\phi}{dL}$$

=change of the phase difference as a function of the fill level.

2. The method as claimed in claim 1, wherein:
the periodic frequency change is a sawtooth-shaped or triangular change of the electrical signal.

3. The method as claimed in claim 1, wherein:
the fill level is measured based on the difference frequency and/or the base phase shift.

4. The method as claimed in claim 3, wherein:
the measuring of the fill level is recalibrated based on the tube inner diameter.

5. The method as claimed in claim 1, wherein:
the phase shift is ascertained by means of a fast Fourier transformation of the difference signal.

6. The method as claimed in claim 1, wherein:
the tube inner diameter is determined based on the change $$\left(\frac{d\Delta\phi}{dL}\right)$$

of the phase difference ($\Delta\phi(L)$) as a function of the fill level.

7. The method as claimed in claim 1, wherein:
the base phase shift is ascertained by a theoretical calculation and/or based on calibration data.

8. The method as claimed in claim 7, wherein:
for the case, in which the base phase shift is ascertained based on calibration data, the calibration, on which the calibration data is based, is performed using a calibration tube, which has the reference inner diameter ($D_0$).

9. The method as claimed in claim 8, wherein:
the calibration is performed using a calibration tube, in the case of which the reference inner diameter ($D_0$) is about equal to the tube inner diameter (D) of the sounding tube.

10. A fill-level measuring device for performing a method comprising the following steps: a method for determining an inner diameter of a sounding tube, wherein, for measuring the fill level of a fill substance located in a process space of a container, the sounding tube extends in the process space, or wherein the sounding tube is placed alongside the container and connected fluidically with the process space, the method comprises method steps as follows: by means of a periodic electrical signal (s), a microwave signal is produced, wherein the electrical signal (s) has a periodic frequency change in the region of a center frequency; the microwave signal is transmitted along the sounding tube in a direction of a surface of the fill substance; an echo signal, which, after reflection of the microwave signal on the surface of the fill substance, is reflected along the sounding tube in opposite direction, is received and converted into an electrical, received signal; by mixing the received signal with the electrical signal, a difference signal with an difference frequency is produced; as a function of the fill level, a phase shift between the difference signal and the electrical signal is ascertained; a phase difference between the phase shift and a previously known, base phase shift, which is based on a reference inner diameter, is ascertained; and based on the phase difference, the tube inner diameter is determined, wherein the tube inner diameter (D) is calculated based on the formula $$D = D_0 * \frac{f_c}{f_r * \sqrt{1 - \left(\frac{\beta}{\alpha}\right)^2}} \text{ with}$$

$$\beta = \sqrt{1 - \left(\frac{f_c}{f_r}\right)^2} \text{ and}$$

$$\alpha = 1 + \frac{c\beta}{8\pi f_r} * \frac{d\Delta\phi}{dL}$$

and
wherein the change $$\left(\frac{d\Delta\phi}{dL}\right)$$

is ascertained by linear regression, and wherein:
c=speed of light;
$\pi$=Archimedes' constant;
$D_0$=reference inner diameter;
$f_c$=limit frequency in a tube with diameter $D_0$;
fr=reference frequency; and $$\frac{d\Delta\phi}{dL}$$

=change of the phase difference as a function of the fill level;
the fill-level measuring device, comprising:
a signal production unit for producing an electrical signal;
an antenna unit for transmitting the microwave signal and/or for receiving the echo signal and/or for changing the reflected echo signal into an electrical, received signal;
a mixer for mixing the electrical signal with the received signal; and
an evaluating unit for determining the tube inner diameter based on the phase difference and/or for determining the fill level based on the frequency of the difference signal.

11. The fill-level measuring device as claimed in claim 10, wherein:
said evaluating unit includes a further processing unit for digitizing and/or for filtering and/or for amplifying the difference signal.

12. The fill-level measuring device as claimed in claim 11, wherein:
said further processing unit includes a bandpass filter, which is especially transmissive for the difference frequency of the difference signal.

13. The fill-level measuring device as claimed in claim 10, further comprising:
a display unit for display of the tube inner diameter.

14. The fill-level measuring device as claimed in claim 10, wherein:
the fill-level measuring device recalibrates itself based on the tube inner diameter.

* * * * *